M. A. RICHARDSON.
Butter Worker.
No. 35,543.
Patented June.10, 1862.
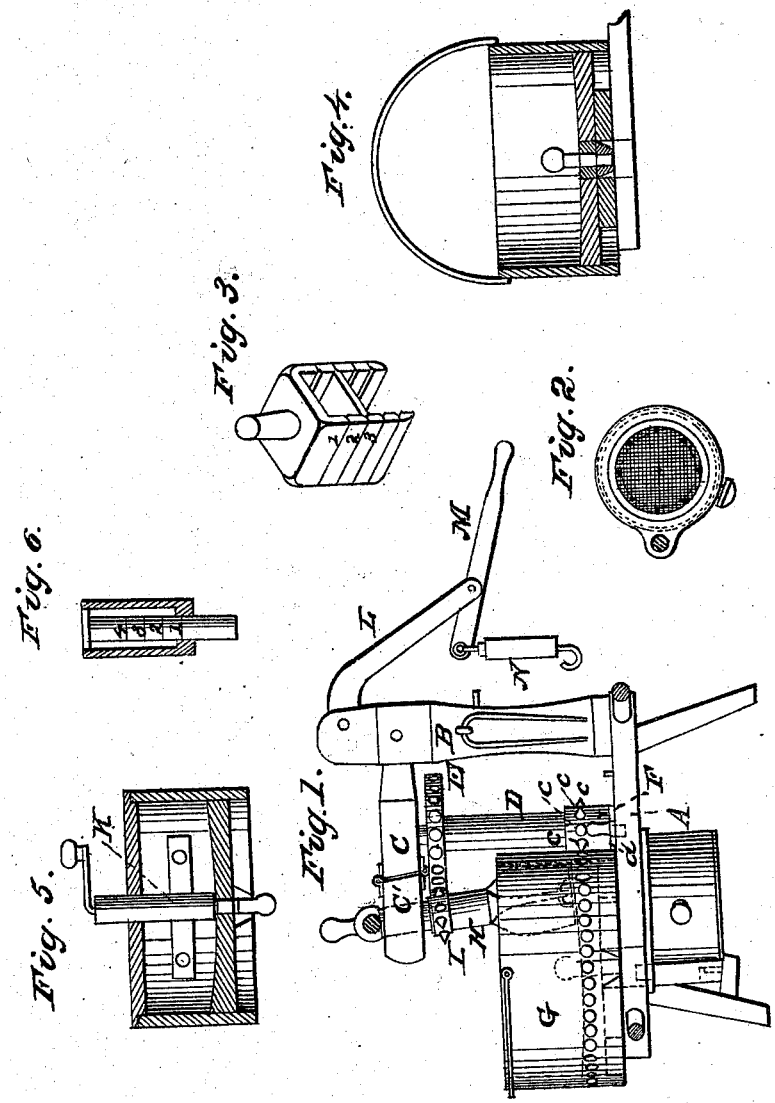

UNITED STATES PATENT OFFICE.

M. A. RICHARDSON, OF SHERMAN, NEW YORK.

IMPROVEMENT IN MACHINES FOR WORKING BUTTER.

Specification forming part of Letters Patent No. 35,543, dated June 10, 1862.

*To all whom it may concern:*

Be it known that I, M. A. RICHARDSON, of Sherman, New York, have invented certain new and useful Improvements in Butter-Workers; and I do hereby declare that the following is a full, clear, and exact description of the same, reference being had to the accompanying drawing, and to the letters of reference marked thereon.

In the annexed drawing, making part of this specification, A is a platform, made of any required size, and which is supported upon legs, as is represented. Upon this platform is erected a standard, B, and projecting from near the top of the standard is an arm, C, with a jointed extension, C'.

D represents a shaft, which stands in a vertical position upon the platform A, its upper bearing being in the arm C, and its lower end having a bearing in a lever, a, which lies upon the platform, and which is pivoted to it at one end. This bearing of the shaft D is near the center of the lever, so that when the said lever is moved the shaft moves, of course, at its lower end.

Surrounding the shaft D, near its upper end, is a wheel, E, with a series of holes in its periphery. Near the lower end of the shaft will be seen a series of pins, c c c, sharpened at their outer ends. These pins are secured at equal distances around the shaft, and are intended to be used instead of cogs.

G represents a tub, which is placed upon the platform, and a suitable pin entering the bottom of the tub to keep it in position and make it revolve around one center upon the the platform. Around the tub, near its bottom, will be seen a series of holes, which are graduated to suit the pins c c c upon the lower end of the shaft D. The pins c c c fit in the holes in the tub, and when the shaft D is revolved the tub is thus made to revolve also.

H represents the butter-worker, the upper end of which passes through the jointed extension C', and is provided with a handle, by means of which the worker is made to revolve. Just beneath the extension C' a series of pins are seen surrounding the worker, similar to those upon the shaft D, just spoken of above. These pins fit in the holes in the periphery of the wheel E and cause it to revolve when the worker is turned. The lower portion of the worker is peculiar in its construction, being formed with three wings, and the formation concave from the point or ridge of one wing to that of another. When the worker is turned, the tub revolves and the ridges of the wings work against the sides of the tub, pressing the butter between the rubber and tub and cutting it in elongated rolls, which stand in a vertical position until released. The natural tendency of the milk is to trickle down and pass away from it.

Cold water is placed in the tub when necessary, or warm water may be used when the butter is too hard from cold for the purpose of softening it. One of the advantages gained by this arrangement is the butter does not spread beyond the action of the wings for two reasons—first, the gravitation of the butter, and, second, the leaning angle of the edge of the blade or wing toward the mass at the moment it enters between the wings. The hinged extension C' allows of the workers being turned up out of the way after the butter is sufficiently worked.

A shaft, K, with wings attached, may be used in the tub G for the purpose of forming a churn, when desirable.

L represents a bar attached to the standard B, which has a lever, M, secured to it, and the lever is provided with spring-scale for weighing the butter. The bar L is so turned that the scale will hang over the tub. The butter is then weighed, so that it may be determined how much salt to use with it.

Having thus fully described my invention, what I claim as new, and desire to secure by Letters Patent, is—

1. The employment of the tub G, worker H, and shaft D with the arm C and hinged extension C', the several parts being constructed and arranged to operate in the manner and for the purpose herein specified.

2. The use of the lever a, upon which the bottom of the shaft D is situated, or in which it has its bearing, for the purpose of throwing out of gear the lower end of said shaft, as is fully set forth.

3. The use of the bar L, lever M, and scale N, when used with the standard B, as and for the purpose specified.

In witness that I claim the foregoing I have hereunto set my hand in the presence of two witnesses.

M. A. RICHARDSON.

Witnesses:
 WM. A. DeLONG,
 S. H. MYRICH.